United States Patent
Bartosch

(10) Patent No.: US 7,409,269 B2
(45) Date of Patent: Aug. 5, 2008

(54) METHODS OF ANALYZING THE VIBRO-ACOUSTIC OPTIMIZATION POTENTIAL AND OPTIMIZING THE VIBRO-ACOUSTIC BEHAVIOR OF A STRUCTURE

(75) Inventor: Thorsten Bartosch, Weiz (AT)

(73) Assignee: Magna Steyr Fahzeugtechnik AG & Co KG (AT)

( * ) Notice: Subject to any disclaimer, the term of this patent is extended or adjusted under 35 U.S.C. 154(b) by 0 days.

(21) Appl. No.: 11/600,519

(22) Filed: Nov. 15, 2006

(65) Prior Publication Data

US 2008/0114496 A1    May 15, 2008

(51) Int. Cl.
*G01M 7/00* (2006.01)
(52) U.S. Cl. .................. 700/280; 700/90; 700/275; 703/2; 703/6; 703/7; 703/8
(58) Field of Classification Search ........... 700/90, 700/280, 275; 703/1, 2, 5–9
See application file for complete search history.

(56) References Cited

U.S. PATENT DOCUMENTS

| 6,090,147 A * | 7/2000 | Bremner et al. ............... 703/1 |
| 6,836,448 B2 * | 12/2004 | Robertsson et al. .......... 367/59 |
| 2006/0259283 A1 * | 11/2006 | Brughmans et al. ........... 703/2 |

OTHER PUBLICATIONS

JP Pub. No. 2002-318154, to Masaaki et al., which discloses vibration and noise analysis system. Abstract only.*

* cited by examiner

*Primary Examiner*—Zoila E. Cabrera
*Assistant Examiner*—Carlos Ortiz Rodriguez
(74) *Attorney, Agent, or Firm*—Bachman & LaPointe, P.C.

(57) ABSTRACT

A method of analyzing the vibro-acoustic optimization potential of a structure of vibro-acoustically coupled subsystems having internal and coupling loss factors by means of statistical energy analysis (SEA). The method optimizes the vibro-acoustic behavior of the structure.

10 Claims, 5 Drawing Sheets

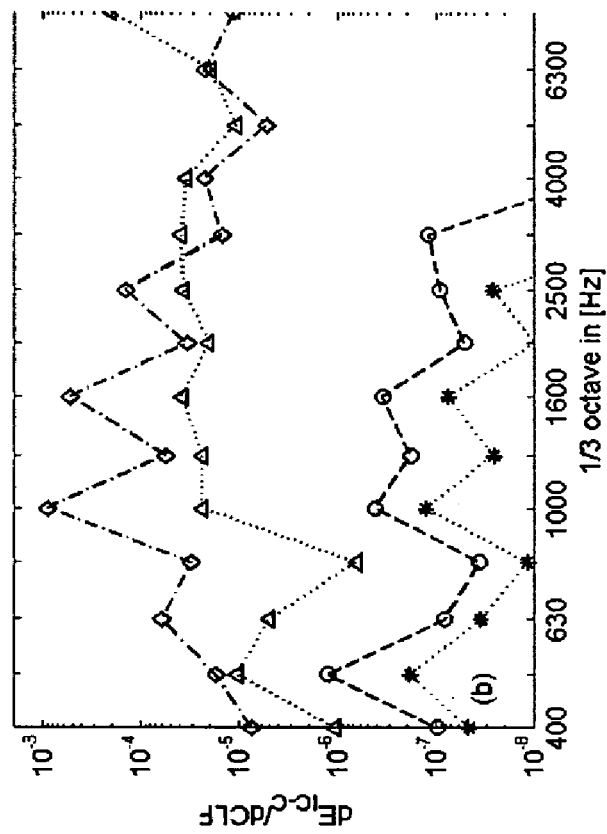
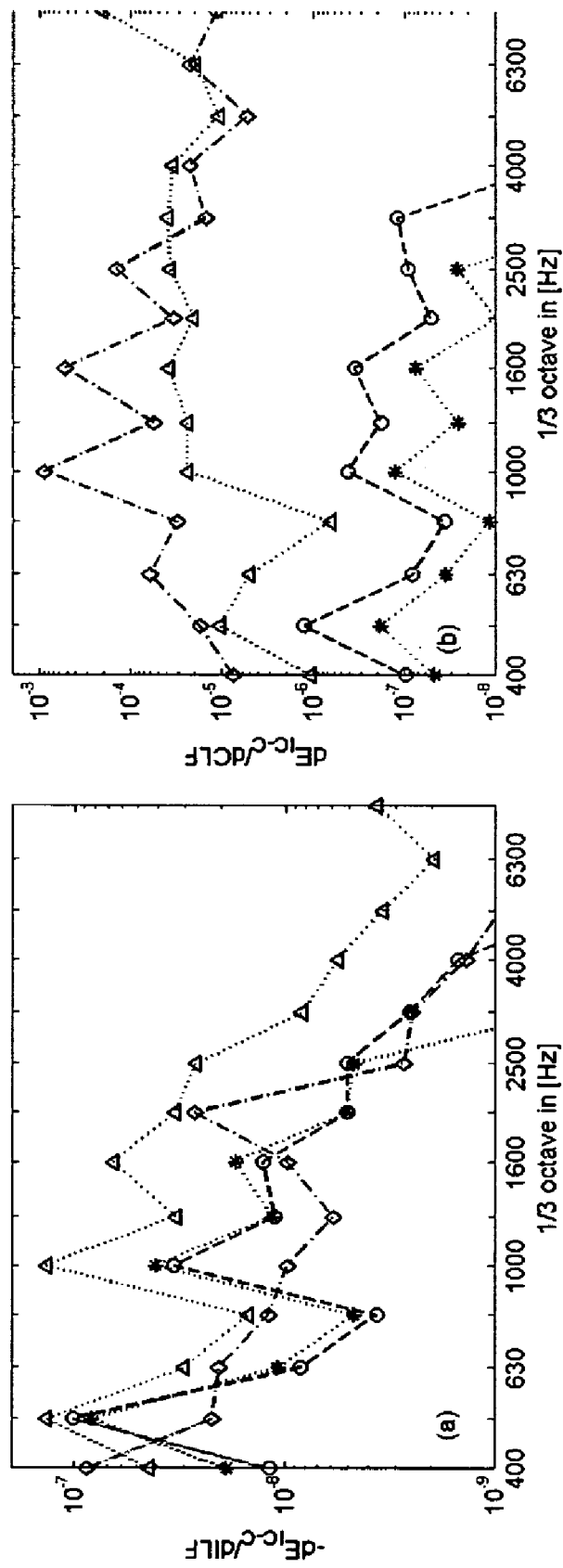
Fig. 4a
Fig. 4b

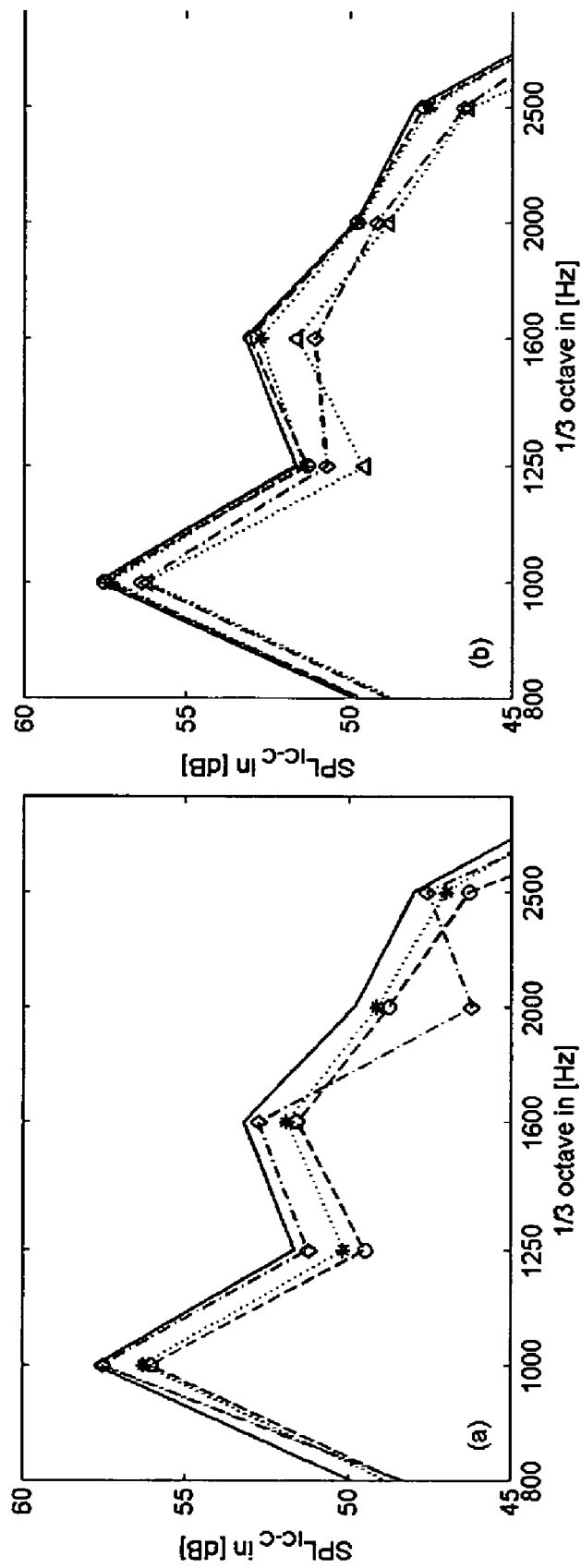

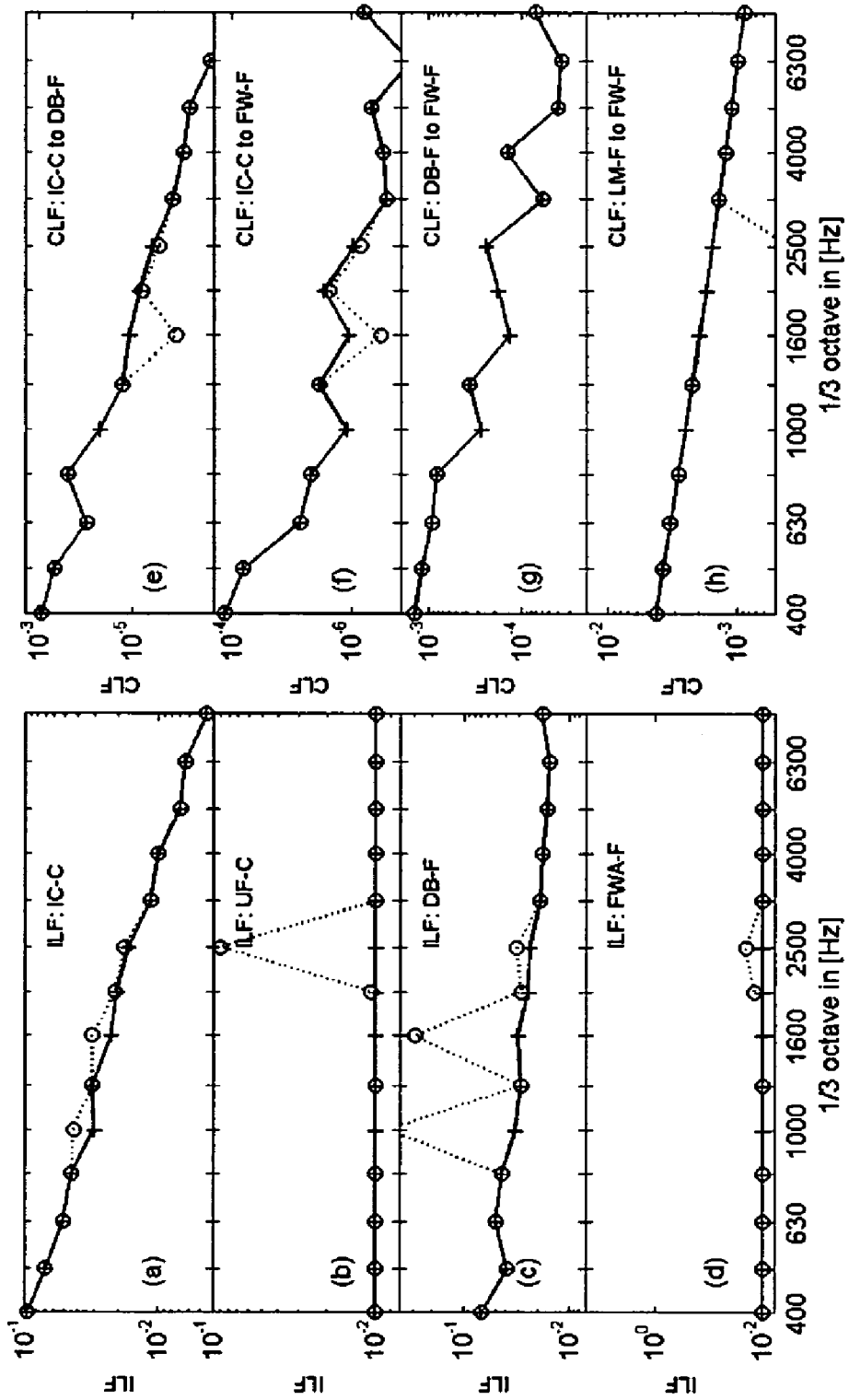
Fig. 6a-d
Fig. 6e-h

METHODS OF ANALYZING THE VIBRO-ACOUSTIC OPTIMIZATION POTENTIAL AND OPTIMIZING THE VIBRO-ACOUSTIC BEHAVIOR OF A STRUCTURE

FIELD OF THE INVENTION

The present invention relates to a method of analyzing the vibro-acoustic optimization potential of a structure of vibro-acoustically coupled subsystems having internal and coupling loss factors by means of a statistical energy analysis (SEA) of a selected subsystem and its sensitivity to changes in the internal and coupling loss factors. The invention further relates to a method of optimizing the vibro-acoustic behavior of such a structure.

In the context of the present application the term "vibro-acoustic" comprises both "vibrational" and/or "acoustic".

BACKGROUND OF THE INVENTION

For optimizing the vibro-acoustic behavior of vehicle bodies above 400 Hz statistical energy analysis (SEA) has become a common tool in recent years. The application of SEA in the automotive industry was first introduced by R. Lyon, G. Maidanik, "Power Flow between Linearly Coupled Oscillators", JASA, 34, 1962; and P. Smith, Jr., "Response and Radiation of Structural Modes Excited by Sound", JASA, 34, 1962.

According to the basic principles of SEA, the stationary average energy E within e.g. a ⅓ octave band with center frequency $\omega_m$ is given by $$\omega_m L(\omega_m) E(\omega_m) = P(\omega_m) \quad (1)$$

wherein $$L = \begin{bmatrix} \eta_{11} + \sum_j \eta_{1j} & -\eta_{21} & \cdots \\ -\eta_{12} & \eta_{22} + \sum_j \eta_{2j} & \cdots \\ \vdots & & \ddots & \cdots \\ -\eta_{1j} & \cdots & & \eta_{jj} + \sum_j \eta_{ij} \end{bmatrix} \quad (2)$$

is the (non-symmetric) SEA matrix consisting of frequency dependent loss factors $\eta_{ij}$, which are in fact internal loss factors (ILFs) of the subsystems for i=j and coupling loss factors (CLFs) between the subsystems for i≠j, with P being the vector of excitation input powers to the subsystems.

According to known methods for analyzing and/or optimizing the vibro-acoustical sensitivity or behavior of structures as disclosed e.g. in E. Sarradj, "Bestimmung von Sensitivitäten mit der Statistischen Energieanalyse", DAGA, Bonn, Feb. 26th-29th 1996"; or N. Lalor and G. Stimpson, "FEM+SEA+OPTIMIZATION=LOW NOISE", 2nd Int. Conference, "Vehicle Comfort: Ergonomic, Vibrational, Noise and Thermal Aspects", Bologna, Italy, Oct. 14th-16th 1992; the gradient of energy of a selected subsystem with respect to a certain ILF or CLF represents a measure of how changes in that ILF/CLF will influence subsystem energy. This measure can therefore be conveniently used to e.g. minimize a selected subsystem energy for noise reduction purposes, for example the interior of a vehicle passenger cell, by adjusting the appropriate ILF/CLF parameter(s).

However, up to now all known methods fail to give a correct estimate of such subsystem energy changes in case of large, i.e. more than local, ILF and/or CLF variations since they rely on a numerical model of the energy gradient only.

Therefore, there is a need for a generally practicable method of analyzing the vibro-acoustic optimization potential of a structure, and subsequently optimizing its vibro-acoustic behavior, by means of statistical energy analysis (SEA), which method yields fast and correct results under a variety of operating circumstances.

SUMMARY OF THE INVENTION

The present invention is based on an analytical calculation of the sensitivity of ILF and CLF parameters. The methods of the invention select a distinct set of dominant ILFs/CLFs which meets the limited optimization space available in reality and can reveal the specific weak points of a given vibro-acoustic design. The invention takes into account that the coupling loss factors between two subsystems are related by the so-called consistency relation of SEA models. In this way vibro-acoustic quantities are provided which give the acoustician an improved tool for complex structured (e.g. multi source) optimization tasks.

In detail, the inventive methods of analyzing and optimizing the vibro-acoustic behavior of a structure of vibro-acoustically coupled subsystems having internal and coupling loss factors by means of a statistical energy analysis (SEA) of a selected sub-system and its sensitivity to changes in the internal and coupling loss factors start from an SEA modeling of the structure wherein the vector E of subsystem energies in a frequency band with center frequency $\omega_m$ is given by $$E = \frac{1}{\omega_m} L^{-1} P$$

with P being the vector of input powers to the subsystems and $$L = \begin{bmatrix} \eta_{11} + \sum_j \eta_{1j} & -\eta_{21} & \cdots \\ -\eta_{12} & \eta_{22} + \sum_j \eta_{2j} & \cdots \\ \vdots & & \ddots & \cdots \\ -\eta_{1j} & \cdots & & \eta_{jj} + \sum_j \eta_{ij} \end{bmatrix}$$

being the SEA matrix of internal and coupling loss factors $\eta_{ij}$. According to the invention, in a first step a) the gradient of energy of said selected subsystem with respect to each of the internal and coupling loss factors is calculated on the basis of a modified SEA matrix in which all coupling loss factors $\eta_{ji}$ with j>i have been replaced by $\eta_{ij}$ according to the SEA consistency relation $\eta_{ij} n_i = \eta_{ji} n_j$, $n_i$ and $n_j$ being the modal densities of the subsystems i, j; then b) those internal loss factors causing the M highest gradients are selected as dominant internal loss factors, and c) those coupling loss factors causing the N highest products, which each consist of a gradient times its coupling loss factor are selected as dominant coupling loss factors;

preferably as next steps d) an optimization potential for each of the dominant internal and coupling loss factors is calculated as the maximum subsystem energy change which can be achieved by varying said internal or coupling loss factor in the relation $$E = \frac{a\eta_{ij} + b}{\eta_{ij} + c}$$

with $\eta_{ij}$ being the dominant internal or coupling loss factor varied, E being the subsystem energy, and a, b, c being constants calculated from a predefined loss factor variation and resultant energy change;

e) the dominant internal and coupling loss factors with the K highest optimization potentials are selected as optimization loss factors;

and preferably as a further step f) at least one of the optimization loss factors is varied by changing the physical properties of the subsystem(s) responsible therefor in order to match given vibro-acoustical targets.

The steps a) to c) lead to the determination of "dominant" (internal and coupling) loss factors which constitute first valuable results of the inventive analyzing method: An acoustician can use these dominant ILFs/CLFs to further investigate and/or optimize a vibro-acoustic structure. Since the methods of the invention take into account the SEA consistency relation when calculating the gradients and dominant loss factors, the methods are resistant vis-à-vis large loss factor variations which leads to reliable, consistent and correct results over the entire range of operating points.

The preferred steps d) and e) give further insights to differentiate between the dominant loss factors ascertained: The "optimization potential" (or short: "potential") of each dominant loss factor is based on an analytical approach and therefore a reliable measure in the entire operating range. Dominant loss factors with the highest optimization potential give the acoustician a precise information which loss factor(s) is/are most effective to optimize in the particularly preferred optimization step f).

BRIEF DESCRIPTION OF THE DRAWINGS

Further objects, features and advantages of the invention will become apparent from the appended claims and the following detailed description of preferred embodiments and examples of the methods of the invention under reference to the enclosed drawings in which:

FIG. 4 shows the sensitivities of the dominant internal (FIG. 4a) and coupling (FIG. 4b) loss factors determined in the example of FIGS. 2 and 3;

FIG. 5 shows the cavity subsystem sound pressure level reduction achievable by varying the optimization loss factors selected from the dominant internal (FIG. 5a) and coupling (FIG. 5b) loss factors of FIG. 4; and FIG. 6 shows the design targets for those optimization loss factors which have been determined from FIG. 5, for ILFs (FIGS. 6a-d) and CLFs (FIGS. 6e-h), which fulfil the desired sound pressure level or energy target given in FIG. 3b.

DETAILED DESCRIPTION OF THE INVENTION

Figure 1:
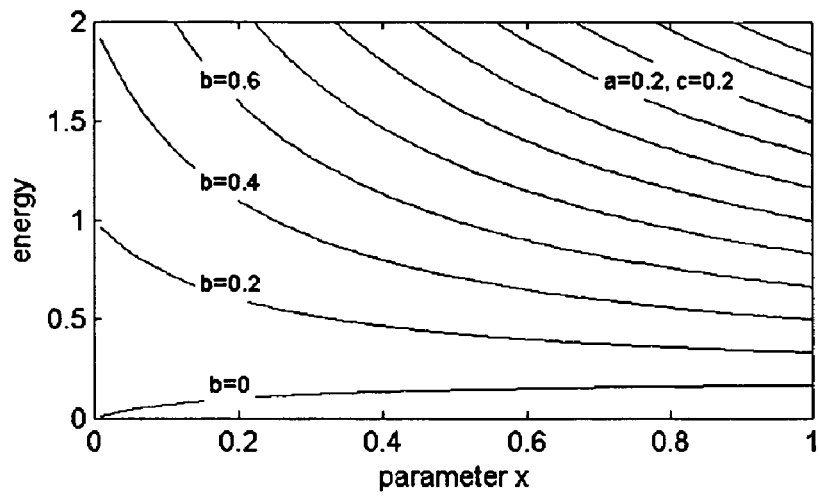
FIG. 1 shows the hyperbolic nature of the energy of a sub-system as a function of an exemplary (internal or coupling) loss factor (parameter) x.

The methods of the invention are now described in detail starting from the steady-state SEA power balancing equations (1) and (2) discussed above. According to SEA theory, the consistency relation of the SEA matrix L is given by $$\eta_{ij}n_i = \eta_{ji}n_j \quad (3)$$

with the modal densities $n_j$, $n_i$ of two subsystems i, j considered.

The gradient vector $G^i$ of the energy $E_i$ of a selected subsystem i with respect to internal and coupling loss factors $\eta$ can be derived from (1) as $$G^i(E_i, \omega_m) = \frac{1}{\omega_m} \nabla_\eta \left((L^{-1}P)^T\right) e_i \quad (4)$$

with the i-th unit vector $\underline{e}_i$.

A parameter set of loss factors is interpreted as the parameter space where the auxiliary constraint (3) defines a sub manifold that is related to $\eta_{ij}$ and $\eta_{ji}$. To avoid linear dependency between basis vectors, all $\eta_{ij} \,\forall\, i>j$ in (2) are substituted using (3) which results in a modified or simplified SEA matrix $\underline{L}$ and therefore $\underline{E}(\omega_m,\underline{\eta})$, where $\underline{\eta}$ means the reduced parameter space where all dimensions $\eta_{ij}$ with i>j are removed.

For simplicity in the following the variable "x" is used for $\underline{\eta}_{sl}$, and in the same sense the term "SEA parameter x" (in short: "parameter") is used synonymously for one of the ILFs and CLFs.

When considering only one component of $G^i$ we therefore have with $x=\underline{\eta}_{sl}$ $$G^i_{sl}(E_i, \omega_m) = \frac{1}{\omega_m} \frac{\partial}{\partial x}\left((L^{-1}_{sl}(x)P)^T e_i\right) \quad (5)$$

with the general structure (s≠1) of $$L_{sl}(x) = \begin{bmatrix} \ddots & & & \\ & x\frac{n_s}{n_l} + R_2 & \cdots & -x \\ & \vdots & \ddots & \vdots \\ & -x\frac{n_s}{n_l} & \cdots & x + R_1 \\ & & & & \ddots \end{bmatrix} \quad (6)$$

where $R_{1,2}$ means a numerical residual. In case of s=1 only one diagonal element consists of an analytical element of the structure $x+R_3$. By matrix permutations the $\underline{L}_{sl}(x)$ matrix can be transformed into block matrixes with an analytical x-dependent A matrix. Then (1) becomes $$\omega_m \begin{bmatrix} A(x) & B \\ C & D \end{bmatrix} \begin{pmatrix} E_a \\ E_b \end{pmatrix} = \begin{pmatrix} P_a \\ P_b \end{pmatrix} \quad (7)$$

and therefore, when assuming that the energy of interest is inside $E_a$, the analytical inversion in (5) can in general be reduced to a 3×3 problem, one dimension in order to permute the energy of interest inside $E_a$ and two dimensions for the permutation of the analytical entries in (6). We get $$E_a = \frac{1}{\omega_m}(A + BD^{-1}C)^{-1}(P_a - BD^{-1}P_b) \quad (8)$$

$$= \frac{1}{\omega_m}\tilde{A}^{-1}\tilde{P}$$

and therefore—when the energy of interest is e.g. $E_1$—we get for the gradient or sensitivity $$G_{sl}^1(\omega_m) = \frac{1}{\omega_m}\frac{\partial}{\partial x}\left(\left(\tilde{A}^{-1}(x)\tilde{P}\right)^T e_1\right) \quad (9)$$

which can be solved analytically using the Sarrus rule. It is to be noted that the terms "sensitivity" and "gradient" are used synonymously within this disclosure.

From (5) and (6) we get the property $$G_{sl}^i = G_{ls}^i \frac{n_s}{n_l} \quad (10)$$

which results with (3) in the symmetry $$G_{sl}^i \eta_{sl} = G_{ls}^i \eta_{ls} \quad (11)$$

which is a very useful relation for the present methods since (11) defines a measure which treats those CLFs which are linked equally.

The application of the Sarrus rule to (8) shows that the functional deployment of the energy with respect to x is $$E_i = \frac{ax + b}{x + c} \quad (12)$$

and the gradient becomes $$G_{sl}^i = \frac{dE_i}{dx} = \frac{ac - b}{(x + c)^2} \quad (13)$$

with a, b, c $\in$ R$_+$ (assuming E$\geq$0).

FIG. 1 which shows a plot of equation (12) for exemplary values of a, b, c. The energy is monotonically increasing for ac<b, monotonous decreasing for b<ac and constant for b=ac. Equation (12) and FIG. 1 demonstrate that there are no local extrema of the energy within the parameter space and that any optimization in the parameter space will always end up at given parameter margins. Hence the gradient always points in the right direction and therefore the following optimization method will yield acceptable results under all operating circumstances.

Steps a-c): Sensitivity Analysis and Parameter Selection

The sensitivity of a single selected subsystem energy with respect to all SEA parameters is calculated using (9). A set of "dominant" internal and coupling loss factors is then chosen independently out of all ILFs and CLFs by application of the schemes $$\forall s, k_s = \max_\omega(|G_{ss}^i(\omega_{sel})|) \quad (14)$$

$$\forall s, l, k_{sl} = \max_\omega(|G_{sl}^i(\omega_{sel})\eta_{sl}^0(\omega_{sel})|)$$

Because of (11) the special choice for $k_{sl}$ ensures that also the reciprocal parameter is taken under consideration. With the vectors $k_1 = [\ldots, k_s, \ldots]^T$ and $k_2 = [\ldots, k_{sl}, \ldots]^T$ we get with $$M_{ILF}(n) = \text{sort}_s(k_1)$$

$$M_{CLF}(m) = \text{sort}_{sl}(k_2) \quad (15)$$

a ranking of dominant SEA parameters which can be restricted by choosing the first M components of $M_{ILF}$ as dominant internal loss factors and the first N components of $M_{CLF}$ as dominant coupling loss factors. Note that $M_{ILF}$ is the set of the gradients $G_{ss}^i$ and $M_{CLF}$ is the set of the products $G_{sl}^i \eta_{sl}^0$ which each consist of a gradient $G_{sl}^i$ times its respective coupling loss factor $\eta_{sl}^0$.

Values of M=N=3 . . . 20, preferably 4 . . . 10, have shown to be practicable and sufficient for present optimization tasks.

Together with the inverse mapping n→s and m→(s, 1), which is known from the sorting algorithms the dominant parameter set is now identified.

Steps d-e): Calculating Optimization Potentials

A vibro-acoustic "optimization potential" of a selected SEA parameter x is now determined by calculating the maximum energy drop which can be achieved by a parameter variation within x $\in$ [0, ∞[. With $E_0 = E_i(\eta^0)$, $E_1 = E_i(\eta^1)$, $\eta^1 = [\eta^0_{11}, \ldots, \eta^0_{sl}/2, \ldots, \eta^0_{s+1,1}, \ldots]^T$ and $G_x = G_{sl}^i$ we get $$a = \frac{xG_xE_1 + 2E_0E_1 - 2E_0^2}{2E_1 + xG_x - 2E_0} \quad (16)$$

$$b = -x\frac{E_0E_1 - E_0^2 + xG_xE_1}{2E_1 + xG_x - 2E_0}$$

$$c = -x\frac{E_1 + xG_x - E_0}{2E_1 + xG_x - 2E_0}$$

and therefore the energy function in (12) is defined. The evaluation of $$E_{x,min} = \min([b/c, \alpha]) \quad (17)$$

results in the optimization potential of the parameter x. The optimization potential expresses the parameter variation in a large scale sense, however, does not regard the physical sense of the parameter variation per se.

Subsequently, the dominant internal and coupling loss factors with the K highest optimization potentials are selected as optimization loss factors for further optimization purposes such as the matching of a given target of the subsystem energy of a selected subsystem. Values of K$\leq$M, N in the range of K=3 . . . 10, preferably 2 . . . 5, have shown to be practicable and sufficient for present optimization tasks.

Step f): Matching Subsystem Energy Targets

Assuming that a given target energy $E^{tg}$ can be reached by the change of only one parameter x, which is the case when $E_0 > E^{tg} > E_{x,min}$ is valid, the inversion of (12) yields the target value of x $$x_{tg} = \frac{E^{tg}c - b}{a - E^{tg}} \quad (18)$$

which fulfills the given energy target exactly and which does not make any further restriction on the admissible parameter range which otherwise would have to be been taken into consideration when a Taylor approximation of the subsystem energy would have been used instead of (12).

Regarding all potentials and target values of a selected dominant parameter set the resulting design freedom can be used for the definition of an optimum acoustic package within the frequency range of interest taking into account all existent vibro-acoustic paths of the vehicle structure model. Besides an SEA model with a given source configuration the application of the methods of the invention does not require any further definitions or setup of the parameter space. Therefore it can be applied efficiently and without limitations concerning the number of paths which are under consideration.

Furthermore it should be considered that the calculation of target values for the optimization parameters constitute vibro-acoustic component targets which can be derived from a complete vehicle acoustic target.

After application of one measure out of the set the sensitivities and energies of the set are recalculated in order to identify additional measures. This step can be omitted if the parameter variation of x was small in the sense that the resulting energy of the regarded subsystem is still within the confidential interval of a first order Taylor approximation $$\hat{E}_i = \hat{E}_i(\eta_0) + G_{s,i}{}^i(\underline{\eta}_{s,i} - \underline{\eta}_{s,i}{}^0) \quad (19)$$

The calculated target values for the SEA parameters constitute a suitable interface for cooperation with material suppliers.

OPTIMIZATION EXAMPLE

Figure 2:
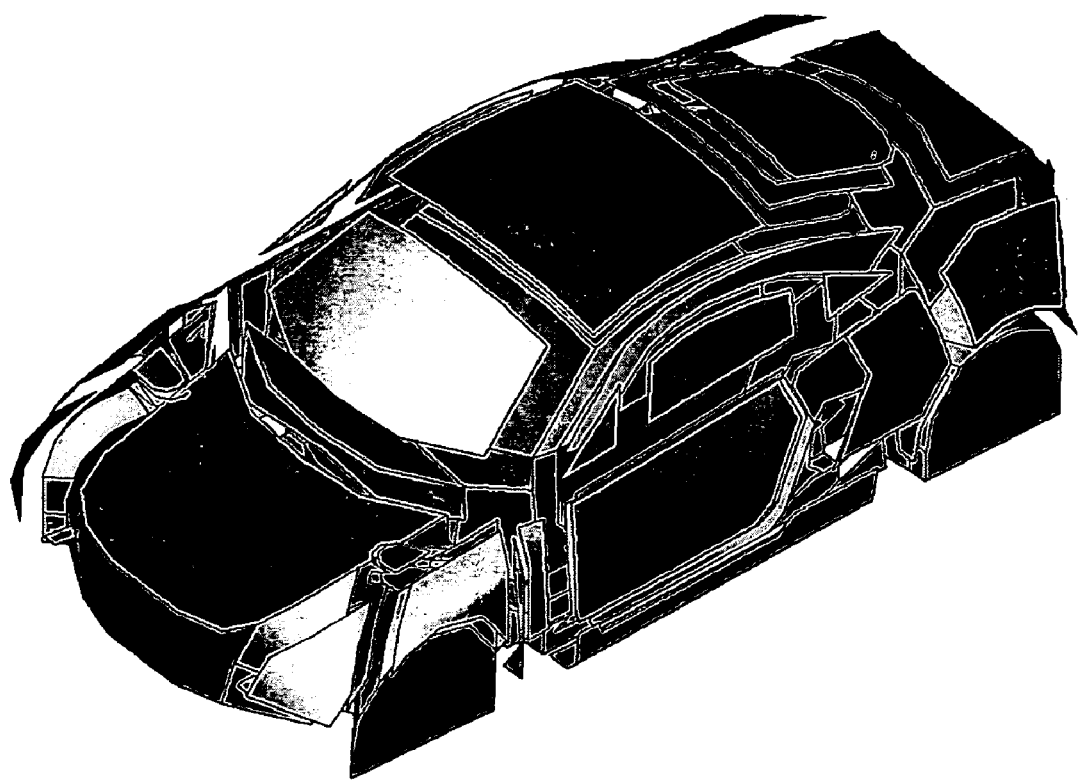
FIG. 2 shows an example of an SEA model structure, here: a vehicle body structure consisting of 82 subsystems, in visual form.

The above methods of the invention were applied to a trimmed body (TB) SEA model of a coupe vehicle which is depicted in FIG. 2. The (internal and coupling) loss factors (parameters) of the model were derived by "Power Injection method (PIM) measurements the theory of which is disclosed inter alia in R. Lyon, R. De-Jong, "Theory and Application of Statistical Energy Analysis", 2nd Edition, Butterworth Heinemann, 1995; D. Bies, S. Hamid, "In Situ Determination of Loss and Coupling Loss Factors by the Power Injection Method", Journal of Sound and Vibration 70 (2), 1980, 187-204; M. Heckl, M. Lewit, "Statistical Energy Analysis as a Tool for Quantifying Sound and Vibration Transmission Paths", in: A. Kaene, W. Price (Eds.), "Statistical Energy Analysis", University Press, Cambridge, 1994, 19-34; N. Lalor, "Practical Considerations for the Measurement of Internal and Coupling Loss Factors on Complex Structures", Tech. Rep. 182, Institute of Sound and Vibration Research, 1990; and K. D. Langhe, P. Sas, "Statistical Analysis of the Power Injection Method", The Journal of the Acoustical Society of America 100, 1996, 294-303.

The use of PIM also resulted in SEA parameters for structural coupling, which is not the case when loss factors are derived from transmission loss and absorption measurements.

The rather coarse SEA model of FIG. 2 consisted of 82 sub-systems, i.e. 33 flat plates, 38 single-curved plates, 1 double-curved plate and 10 cavities. An exemplary power input configuration was developed by wide open throttle measurements on a dynamometer rig at 4000 rpm constant speed. The design and validation of the model and the SEA source measurements took place in cooperation with the Acoustic Competence Centre in Graz, Austria.

For the dynamometer rig measurements the engine noise was considered to excite the engine bay by air-borne and the front longitudinal members by structural excitation. The contribution of rolling noise was omitted due to the strong engine noise presence. The exhaust system was assembled beside the car so that structural excitations were reduced. The air-borne fractions were reduced by additional damping measures.

In case of a subsystem which represented an air-filled cavity within the vehicle structure the energy of the subsystem was expressed as average "sound pressure level" (SPL), in case of a subsystem which represented a solid component of the structure the energy was expressed as average "velocity", or "acceleration", respectively.

The measurement resulted in average velocities of the front longitudinal members and an average pressure level of the engine bay. After application of these vectors to a SEA model as constraints with correct masses and volumes for the constrained subsystem the effective input power vectors could be retrieved from a simulation program, see FIG. 3a which shows an example of the structural (solid line) and acoustic (dotted line) effective input powers related to engine noise.

While the dotted line showed the air-borne power input which was applied at the engine bay, the solid line showed the structure borne excitation which was applied two times (left and right longitudinal member) in the model. For frequencies above 1.6 kHz the air-borne excitation dominated the structural excitation (graph+3 dB) by more than 10 dB. In the lower frequency range there were two structural power peaks at 500 Hz and at 1 kHz which surpassed the air-borne excitation levels. The passenger compartment was chosen as the response subsystem ("selected subsystem"). The simulated response in-cabin sound pressure level (SPL)—as a measure of the subsystem energy—was plotted in FIG. 3b wherein a target SPL (dotted line) was depicted which can be transformed into a target subsystem energy. This target in-cabin SPL was chosen according to the thick dotted line in the diagram which was surpassed by the simulated SPL for the angular frequencies $f_{sel} = [1, 1.6, 2, 2.5]^T$ kHz.

In total the model consisted of 174 ILF and 1555 CLF parameters. There were more ILFs than subsystems as the structural subsystems which had not been treated according to PIM were mathematically modeled as three individual subsystems each for one of the wave types "flexure", "extension" and "shear". The selection of the first four dominant loss factors according to (14) and (15) with respect to $f_{sel}$ yielded the following ranking for ILFs and CLFs:

| ranking | ILFs | in FIG. 4a | CLFs | in FIG. 4b |
| --- | --- | --- | --- | --- |
| 1 | IC-C | ....△.... | IC-C to DB-F | ....△.... |
| 2 | UF-C | -.-.◇.-.- | IC-C to FW-F | -.-.◇.-.- |
| 3 | DB-F | --○-- | DB-F to FW-F | --○-- |
| 4 | FWA-F | ....*.... | LM-F to FW-F | ....*.... | with the abbreviations
IC-C in-cabin cavity,
UF-C under-floor cavity,
DB-F dashboard flexure wave type,
FWA-F front wheel arch flexure wave type, and
LM-F longitudinal member flexure wave type.

The sensitivities according to (9) were depicted in FIG. 4 which showed the dominant sensitivities for engine excitation.

The analysis revealed that sensitivities of CLFs in FIG. 4b dominated the in-cabin SPL by a factor 100 more than the sensitivities of the ILFs in FIG. 4a. Furthermore, a comparison between the ranking table and the CLF sensitivity values in the diagram showed a sequencing difference which showed that the search in (15) yielded different results when compared with a search for a maximal sensitivity alone.

For all selected parameters the vibro-acoustic optimization potentials were then plotted in FIG. 5 wherein FIG. 5a showed the potential decrease of in-cabin SPL for the ILFs selected as optimization loss factors and FIG. 5b for the CLFs selected as optimization loss factors. The line identifiers used in FIG. 5 are:

| ILFs | in FIG. 5a | CLFs | in FIG. 5b |
|---|---|---|---|
| baseline | --- | baseline | --- |
| IC-C |  | IC-C to DB-F | ....△.... |
| UF-F | -.-◇.-.- | IC-C to FW-F | -.-◇.-.- |
| DB-F | --○-- | DB-F to FW-F | --○-- |
| FWA-F | ....*.... | LM-F to FW-F | ....*.... |

FIG. 5a showed the ILF potentials. The curve for "IC-C" was missing as its curve was below −100 dB which meant that for a theoretical damping $\eta_{IC\text{-}C} \to \infty$ the in-cabin SPL would tend to zero. Therefore an increase of in-cabin damping would be most effective. Of course the same would hold for the excitation subsystem in the case of a single source configuration. On the other hand the diagram showed potentials from 0-4 dB which suggested additional structural damping for the dashboard and the front wheel housings (left and right structural excitation subsystems). The suggested damping increase of the under-floor cavity which is usually hard to influence was omitted.

The investigation of FIG. 5b revealed potentials between 1-2 dB when reducing the coupling "IC-C to DB-F" and "IC-C to FW-F". The potential was below 1 dB for the two remaining structural couplings "DB-F to FW-F" and "LM-F to FW-F".

Figures 3A, 3B:
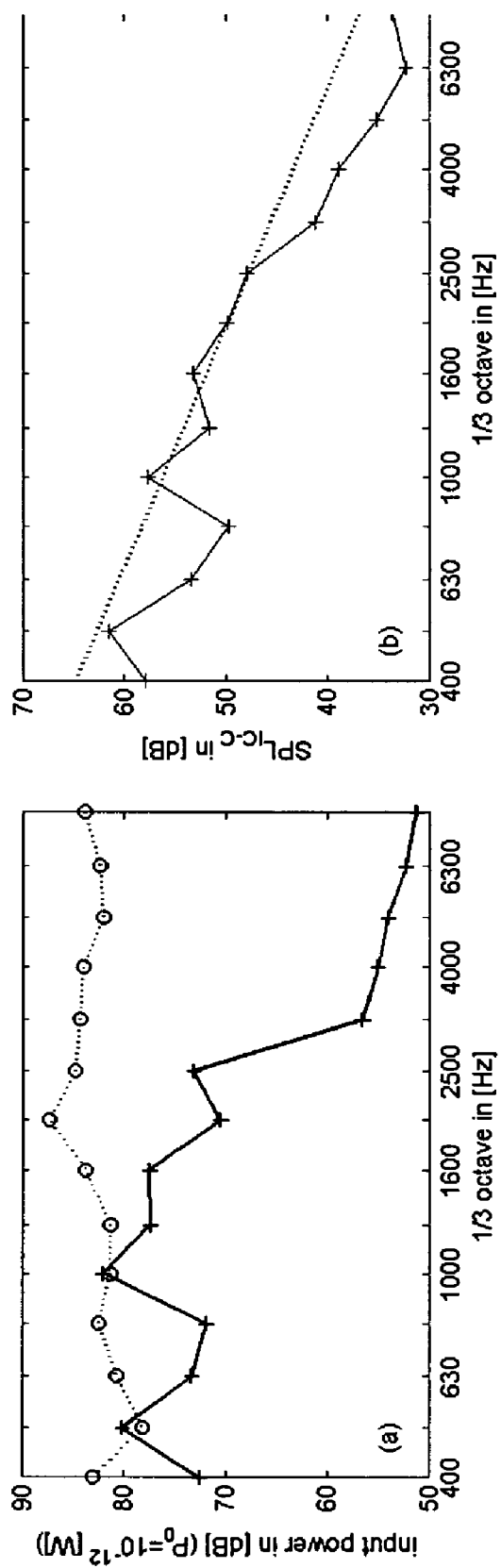
FIG. 3a shows two exemplary input power spectra originating from engine noise and FIG. 3b the sound pressure level of a selected cavity subsystem in response thereto in a frequency diagram.

The design target SPL in FIG. 3b could be related to a threshold energy $E^{th} = V/(\rho c^2) P_a^2$. With $V = V_{IC\text{-}C} = 2.527\ m^3$, the target energy $$T^{tg}(\omega_m) = \begin{cases} E_0(\omega_m) \forall\ E_0(\omega_m) \leq E^{th}(\omega_m) \\ E^{th}(\omega_m) \forall\ E_0(\omega_m) \geq E^{th}(\omega_m) \end{cases} \quad (20)$$

and (18) the loss factor targets could be computed. The results were displayed in FIG. 6 which showed the design targets for the selected optimization parameters. FIGS. 6a-6d showed the ILF design targets, FIGS. 6e-6h the CLF design targets. The solid graphs represented the origin loss factor values while the dotted lines indicated the design targets. A missing target value indicated that the design target could not be fulfilled.

For the design of damping measures shown in FIGS. 6a-6e it was suggested to slightly increase the damping of "IC-C" or alternatively to increase the structural damping of "DB-F". As already mentioned there were no meaningful measures to increase the under-floor damping. Last but not least the target damping curve for flexural damping of "FWA-F" showed only one meaningful target value at 2.5 kHz. All other values were missing because of $E^{tg} < E_{x,min}$ or were inadmissible as they were too high. On the other hand the targets could also be reached by a decrease of the coupling "IC-C to DB-F" except at 1 kHz, see FIGS. 6e-6h. The remaining three target CLFs showed that they turned negative (no value displayed) for one ore more frequencies. So in the present example the target could not be reached by a single CLF-decreasing measure.

What is claimed is:

1. A method of analyzing a vibro-acoustic optimization potential of a structure of vibro-acoustically coupled subsystems having internal and coupling loss factors, by means of a statistical energy analysis (SEA) of a selected subsystem and its sensitivity to changes in the internal and coupling loss factors, wherein the subsystem energies E in a selected frequency band with center frequency $\omega_m$ are given by $\omega_m L \cdot E = P$, with P being input powers to the subsystems and L being an SEA matrix of internal and coupling loss factors $\eta_{ij}$, comprising the steps of:
   a) calculating a gradient of energy of said selected subsystem with respect to each of the internal and coupling loss factors on a basis of a simplified SEA matrix in which all coupling loss factors $\eta_{ji}$ with j>i have been substituted by the respective $\eta_{ij}$ according to a relation $\eta_{ij} n_i = \eta_{ji} n_j$, with $n_i$ and $n_j$ being a modal densities of subsystems i, j involved;
   b) identifying the internal loss factors causing M highest gradients, M being a given integer, as dominant internal loss factors for the vibro-acoustic optimization of the structure, and
   c) identifying the coupling loss factors causing N highest products, which each consist of the gradient times its coupling loss factor, N being a given integer, as dominant coupling loss factors for the vibro-acoustic optimization of the structure.

2. A method of analyzing a vibro-acoustic optimization potential of a structure of vibro-acoustically coupled subsystems having internal and coupling loss factors, by means of a statistical energy analysis (SEA) of a selected subsystem and its sensitivity to changes in the internal and coupling loss factors, wherein the subsystem energies E in a selected frequency band with center frequency $\omega_m$ are given by $\omega_m L \cdot E = P$, with P being input powers to the subsystems and L being an SEA matrix of internal and coupling loss factors $\omega_{ij}$, comprising the steps of:
   a) calculating a gradient of energy of said selected subsystem with respect to each of the internal and coupling loss factors on a basis of a simplified SEA matrix in which all coupling loss factors $\omega_{ji}$ with j>i have been substituted by the respective $\omega_{ij}$ according to a relation $\omega_{ij} n_i = \omega_{ji} n_j$ with $n_i$ and $n_j$ being a modal densities of subsystems i, j involved;
   b) identifying the internal loss factors causing M highest gradients, M being a given integer, as dominant internal loss factors for the vibro-acoustic optimization of the structure,
   c) identifying the coupling loss factors causing N highest products, which each consist of the gradient times its coupling loss factor, N being a given integer, as dominant coupling loss factors for the vibro-acoustic optimization of the structure,
   d) calculating an optimization potential for each of the dominant internal and coupling loss factors as a maximum subsystem energy change which can be achieved by varying said loss factor; and
   e) identifying the dominant internal and coupling loss factors with K highest optimization potentials, K being a given integer, as optimization loss factors for the vibro-acoustic optimization of the structure.

3. The method of claim 2, wherein in step d) the optimization potential for each of the dominant internal and coupling loss factors is calculated from a hyperbolic function of said dominant internal or coupling loss factor.

4. The method of claim 3, wherein the hyperbolic function is relation $$E = \frac{a\eta_{ij} + b}{\eta_{ij} + c}$$

with $\omega_{ij}$ being the dominant internal or coupling loss factor variied, E being a subsystem energy, and a, b, c being constants calculated from a predefined loss factor variation and concomitant energy change.

5. The method of claim 4, wherein in step d) said loss factor is varied between 0 and ∞ for calculating the maximum subsystem energy change achievable.

6. A method of optimizing a vibro-acoustic behavior of a structure of vibro-acoustically coupled subsystems having internal and coupling loss factors, by means of a statistical energy analysis (SEA) of a selected subsystem and its sensitivity to changes in the internal and coupling loss factors, wherein an averaged subsystem energies E around a frequency $\omega_m$ are given by $\omega_m L \cdot E = P$, with P being input powers and L being an SEA matrix of internal and coupling loss factors $\eta_{ij}$, comprising the steps of:
  a) calculating a gradient of energy of said selected subsystem with respect to each of the loss factors on a basis of a simplified SEA matrix in which all loss factors $\eta_{ji}$ with j>i are substituted by $\eta_{ij}$ using a relation $\eta_{ij} n_i = \eta_{ji} n_j$ and $n_i$ being a modal densities of subsystems i, j involved;
  b) determining those internal loss factors causing M highest gradients, M being a given integer, as dominant internal loss factors, and
  c) determining those coupling loss factors causing N highest products, which each consist of the gradient multiplied by its coupling loss factor, being given integer, as dominant coupling loss factors;
  d) calculating an optimization potential for each of the dominant internal and coupling loss factors as a maximum subsystem energy drop which can be achieved by varying said internal or coupling loss factor;
  e) selecting the dominant internal and coupling loss factors with K highest optimization potentials, K being a given integer, as optimization loss factors, and
  f) varying at least one of the optimization loss factors by changing physical properties of the subsystem(s) responsible therefor in order to match given vibro-acoustical targets.

7. The method of claim 6, wherein in step d) the optimization potential for each of the dominant internal and coupling loss factors is calculated from hyperbolic relation $$E = \frac{a\eta_{ij} + b}{\eta_{ij} + c}$$

with $\eta_{ij}$ being a dominant loss factor varied, E being a subsystem energy, and a, b, c being constants calculated from predefined loss factor variation and resultant energy change.

8. The method of claim 7, wherein in step d) said loss factor is varied between 0 and ∞ for calculating the maximum subsystem energy drop achievable.

9. The method of claim 6, wherein the structure is vehicle and the selected subsystem is an interior of the passenger cell of the vehicle.

10. method of optimizing a vibro-acoustic behavior of structure of vibro-acoustically coupled subsystems having internal and coupling loss factors by means of a statistical energy analysis (SEA) of selected subsystem and its sensitivity to changes in the internal and coupling loss factors, wherein vector E of subsystem energies in a frequency band with center frequency $\omega_m$ is given by $$E = \frac{1}{\omega_m} L^{-1} P$$

with P being a vector of input powers to the subsystems and $$L = \begin{bmatrix} \eta_{11} + \sum_j \eta_{1j} & -\eta_{21} & \cdots & \\ -\eta_{12} & \eta_{22} + \sum_j \eta_{2j} & \cdots & \\ \vdots & & \ddots & \cdots \\ -\eta_{1j} & \cdots & & \eta_{ii} + \sum_j \eta_{1j} \end{bmatrix}$$

being an SEA matrix of internal and coupling loss factors $\eta_{ij}$, comprising the steps of:
  a) calculating a gradient of energy of said selected subsystem with respect to each of the internal and coupling loss factors on a basis of modified SEA matrix in which all coupling loss factors $\eta_{ji}$ with j>i have been replaced by $\eta_{ij}$ according to an SEA consistency relation $\eta_{ij} n_i = \eta_{ji} n_j$, $n_i$ and $n_j$ being a modal densities of subsystems i, j;
  b) selecting the internal loss factors causing M highest gradients, M being given integer, as dominant internal loss factors, and
  c) selecting the coupling loss factors causing N highest products, which each consist of the gradient times its coupling loss factor, N being given integer, as dominant coupling loss factors;
  d) calculating an optimization potential for each of the dominant internal and coupling loss factors as a maximum subsystem energy change which can be achieved by varying said internal or coupling loss factor in a relation $$E = \frac{a\eta_{ij} + b}{\eta_{ij} + c}$$

with $\eta_{ij}$ being the dominant internal or coupling loss factor varied, E being a subsystem energy, and a, b, c being constants calculated from predefined loss factor variation and resultant energy change;
  e) selecting the dominant internal and coupling loss factors with K highest optimization potentials, K being a given integer, as optimization loss factors; and
  f) varying at least one of the optimization loss factors by changing physical properties of the subsystem(s) responsible therefor in order to match given subsystem energy.

* * * * *

UNITED STATES PATENT AND TRADEMARK OFFICE
CERTIFICATE OF CORRECTION

PATENT NO. : 7,409,269 B2
APPLICATION NO. : 11/600519
DATED : August 5, 2008
INVENTOR(S) : Thorsten Bartosch It is certified that error appears in the above-identified patent and that said Letters Patent is hereby corrected as shown below:

1. Title Page, Item [73] under the "Assignee" delete "Magna Steyr Fahzeugtechnik AG & Co KG" and insert --Magna Steyr Fahrzeugtechnik AG & Co KG--.

2. In column 6, line 60, delete "been".

3. In column 9, line 57, delete "ore" and insert --or--.

4. In column 10, claim 2, line 28, delete "ωij" and insert --ηij--.

5. In column 10, claim 2, line 33, delete "ωji" and insert --ηji--.

6. In column 10, claim 2, line 34, delete "ωij" and insert --ηij--.

7. In column 10, claim 2, line 34, delete "ωijni = ωjini" and insert --ηijni = ηjinj,--.

8. In column 10, claim 4, line 66, delete "ω" and insert --η--.

9. In column 10, claim 4, line 67, delete "variied" and insert --varied--.

10. In column 11, claim 6, line 19, delete "and" and insert --,-- and after "ni" insert --and nj--.

11. In column 11, claim 6, line 26, after "loss factor," insert --N--, and after "being" insert --a--.

12. In column 11, claim 7, line 49, after "from" insert --a--.

13. In column 11, claim 10, line 57, before "method" insert --A--, and after "behavior of" insert --a--.

14. In column 11, claim 10, line 60, after "(SEA) of" insert --a--.

UNITED STATES PATENT AND TRADEMARK OFFICE
CERTIFICATE OF CORRECTION

PATENT NO. : 7,409,269 B2
APPLICATION NO. : 11/600519
DATED : August 5, 2008
INVENTOR(S) : Thorsten Bartosch It is certified that error appears in the above-identified patent and that said Letters Patent is hereby corrected as shown below:

15. In column 12, claim 10, line 29, delete "ŋijn" and insert --ŋijni--.

16. In column 12, claim 10, line 32, after "being" insert --a--.

17. In column 12, claim 10, line 36, after "being" insert --a--.

18. In column 12, claim 10, line 51, after "from" insert --a--.

19. In column 12, claim 10, line 58, after "match" insert --a--.

Signed and Sealed this

Sixteenth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,409,269 B2
APPLICATION NO. : 11/600519
DATED : August 5, 2008
INVENTOR(S) : Thorsten Bartosch It is certified that error appears in the above-identified patent and that said Letters Patent is hereby corrected as shown below:

1. Title Page, Item [73] under the "Assignee" delete "Magna Steyr Fahzeugtechnik AG & Co KG" and insert --Magna Steyr Fahrzeugtechnik AG & Co KG--.

2. In column 6, line 60, delete "been".

3. In column 9, line 57, delete "ore" and insert --or--.

4. In column 10, claim 2, line 28, delete "$\omega_{ij}$" and insert --$\eta_{ij}$--.

5. In column 10, claim 2, line 33, delete "$\omega_{ji}$" and insert --$\eta_{ji}$--.

6. In column 10, claim 2, line 34, delete "$\omega_{ij}$" and insert --$\eta_{ij}$--.

7. In column 10, claim 2, line 35, delete "$\omega_{ij} n_i = \omega_{ji} n_i$" and insert --$\eta_{ij} n_i = \eta_{ji} n_j$,--.

8. In column 10, claim 4, line 66, delete "$\omega_{ij}$" and insert --$\eta_{ij}$--.

9. In column 10, claim 4, line 67, delete "variied" and insert --varied--.

10. In column 11, claim 6, line 19, delete "and" and insert --,--, and after "$n_i$" insert --and $n_j$--.

11. In column 11, claim 6, line 26, after "loss factor," insert --N--, and after "being" insert --a--.

12. In column 11, claim 7, line 49, after "from" insert --a--.

13. In column 11, claim 10, line 57, before "method" insert --A--, and after "behavior of" insert --a--.

14. In column 11, claim 10, line 60, after "(SEA) of" insert --a--.

UNITED STATES PATENT AND TRADEMARK OFFICE
CERTIFICATE OF CORRECTION

PATENT NO. : 7,409,269 B2
APPLICATION NO. : 11/600519
DATED : August 5, 2008
INVENTOR(S) : Thorsten Bartosch It is certified that error appears in the above-identified patent and that said Letters Patent is hereby corrected as shown below:

15. In column 12, claim 10, line 29, delete "$\eta_{ij}n$" and insert --$\eta_{ij}n_i$--.

16. In column 12, claim 10, line 32, after "being" insert --a--.

17. In column 12, claim 10, line 36, after "being" insert --a--.

18. In column 12, claim 10, line 51, after "from" insert --a--.

19. In column 12, claim 10, line 58, after "match" insert --a--.

This certificate supersedes the Certificate of Correction issued June 16, 2009.

Signed and Sealed this

Twenty-ninth Day of December, 2009

David J. Kappos
*Director of the United States Patent and Trademark Office*